(12) United States Patent
Sudo et al.

(10) Patent No.: US 7,265,540 B2
(45) Date of Patent: Sep. 4, 2007

(54) ANGLE SENSOR HAVING LOW WAVEFORM DISTORTION

(75) Inventors: Yoshihiro Sudo, Miyagi-ken (JP); Ichiro Tokunaga, Miyagi-ken (JP); Yoshikazu Shimizu, Miyagi-ken (JP); Naoya Hasegawa, Niigata-ken (JP); Fumihito Koike, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 103 days.

(21) Appl. No.: 10/879,674

(22) Filed: Jun. 28, 2004

(65) Prior Publication Data

US 2004/0263157 A1    Dec. 30, 2004

(30) Foreign Application Priority Data

Jun. 30, 2003    (JP)    ............................. 2003-187161

(51) Int. Cl.
  *G01B 7/30* (2006.01)
  *G01R 33/09* (2006.01)
  *H01L 43/08* (2006.01)

(52) U.S. Cl. ................ 324/207.21; 324/252; 338/32 R (58) Field of Classification Search ........... 324/207.21, 324/207.25, 244, 249, 252; 365/158, 173; 338/32 R; 360/324, 324.1, 324.2
See application file for complete search history.

(56) References Cited

U.S. PATENT DOCUMENTS 6,175,296 B1 * 1/2001 Tokunaga et al. ......... 338/32 R 6,313,627 B1 * 11/2001 Van Den Berg ............ 324/252
6,366,079 B1 * 4/2002 Uenoyama ............. 324/207.21
6,501,678 B1 * 12/2002 Lenssen et al. ............. 365/173
6,946,834 B2 * 9/2005 Van Zon et al. ............ 324/252
2003/0070497 A1 * 4/2003 Kikuchi et al. ........ 73/862.333
2006/0103381 A1 * 5/2006 Schmollngruber et al. .. 324/252

FOREIGN PATENT DOCUMENTS

DE    1015300 B    9/1957
JP    2002-303536    10/2002
JP    2002303536    10/2002

OTHER PUBLICATIONS

European Search Report for Application No. EP 04 01 5243 dated Jul. 24, 2006.

* cited by examiner

*Primary Examiner*—Edward Lefkowitz
*Assistant Examiner*—Kenneth J Whittington
(74) *Attorney, Agent, or Firm*—Beyer Weaver LLP (57) ABSTRACT

A magnetoresistive element includes a meandering X-axis array that is constituted by X-axis segments alternately connected, and a meandering Y-axis array that is constituted by Y-axis segments alternately connected. When rotated 90°, the Y-axis array has the same layout as the X-axis array. Such a structure cancels the electrical resistance change due to the AMR effect, thus reducing the waveform distortion of output voltage.

2 Claims, 9 Drawing Sheets

ANGLE SENSOR HAVING LOW WAVEFORM DISTORTION

BACKGROUND OF THE INVENTION

1. Field of the Invention

The present invention relates to an angle sensor including a magnetoresistive element, such as a GMR element, and particularly to an angle sensor that can reduce the waveform distortion of output voltage.

2. Description of the Related Art

Angle sensors including magnetoresistive elements are already known (see, for example, Japanese Unexamined Patent Application Publication No. 2002-303536).

The magnetoresistive element is a laminate that essentially consists of an antiferromagnetic layer, a pinned magnetic layer, a nonmagnetic material layer, and a free magnetic layer. The pinned magnetic layer is unidirectionally magnetized by a coupling magnetic field generated between the pinned magnetic layer and the antiferromagnetic layer. The magnetization of the free magnetic layer varies under an external magnetic field.

The angle sensor may be provided with a rotor having a magnet over the magnetoresistive element. The rotation of the rotor changes the direction of a magnetic flux flowing into the laminate from the magnet.

The magnetization of the free magnetic layer varies with the direction of the magnetic flux, and thereby the electrical resistance and therefore the output voltage of the magnetoresistive element vary. The angle sensor detects the rotation angle based on the change in the output voltage.

Figure 7:
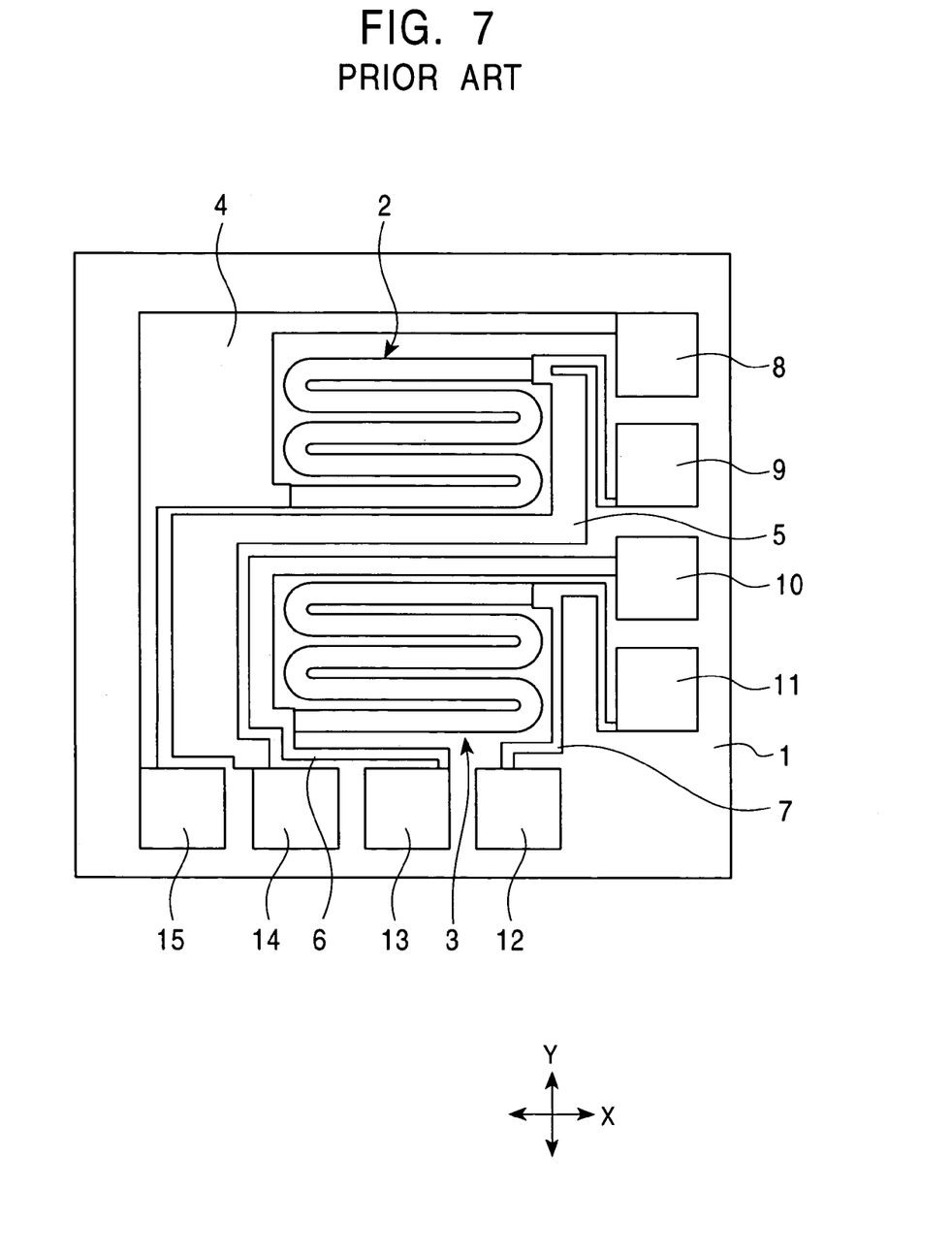
FIG. 7 is a plan view of a magnetic detector mounted on a conventional rotation angle sensor.

FIG. 7 shows a magnetoresistive element for use in a conventional angle sensor.

Two magnetoresistive elements 2 and 3 are disposed on a substrate 1. Each end of the magnetoresistive elements 2 and 3 is connected to a lead 4, 5, 6, or 7 made of Au or the like. The leads 4, 5, 6, and 7 have terminals 8-15 at their opposite ends.

Four substrates 1, for example, are disposed below the rotor. Any magnetoresistive elements on the substrates 1 are connected to one another to form a Wheatstone bridge.

The magnetoresistive elements 2 and 3 extend in the X-axis direction (the width direction of the substrate 1), and meander in the Y-axis direction (the depth direction of the substrate 1), thus forming a single zigzag structure.

The electrical resistance of the magnetoresistive element is expressed by the following equation:

$$R_g = R_{g0} - \Delta R_g \cos\theta \qquad (1)$$

wherein $R_g$ is an electrical resistance of the magnetoresistive element, $R_{g0}$ is a center resistance, $\Delta R_g$ is an amplitude of the electrical resistance change, and $\theta$ is an angular difference in the magnetization direction between the pinned magnetic layer and the free magnetic layer.

To obtain a theoretical waveform of output voltage, the magnetization direction of the pinned magnetic layer should be independent of the external magnetic field, and the magnetization direction of the free magnetic layer should be identical to the direction of the external magnetic field. However, in practice, the magnetization direction of the free magnetic layer is not identical to the direction of the external magnetic field. This, in combination with other factors, causes the measured waveform of output voltage to deviate slightly from the theoretical waveform.

Figure 8:
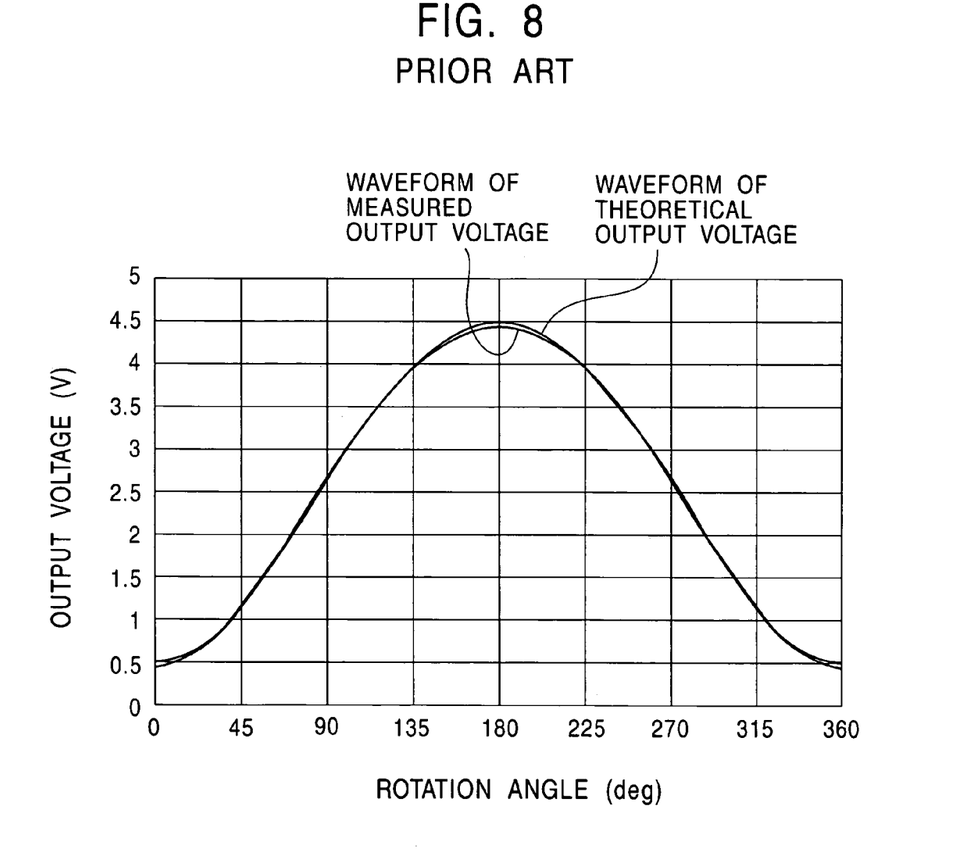
FIG. 8 is a graph showing a waveform of output voltage measured with the magnetoresistive element shown in FIG. 7 and a waveform of output voltage obtained from theoretical values.

FIG. 8 shows a waveform of the output voltage generated by the rotation of a rotor that has a magnet and faces the substrate 1 in FIG. 7. The measured waveform of output voltage deviates from the theoretical waveform.

Figure 9:
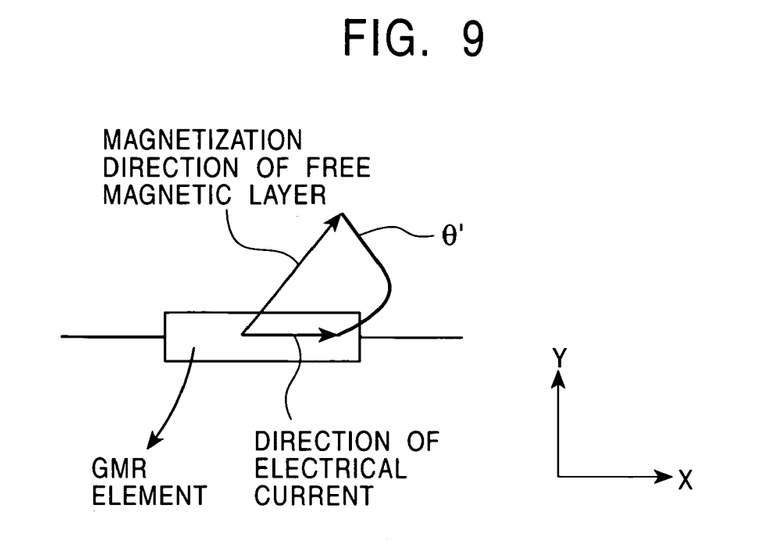
FIG. 9 is a schematic diagram illustrating a contributing resistance generated by the AMR effect.

Such a distortion of the waveform may partly result from AMR (anisotropic magnetoresistance) effect, which is illustrated in FIG. 9. When an electric current runs through a GMR element aligned in the X-axis direction, and a free magnetic layer is magnetized at an angle of θ', the AMR effect is expressed by the following equation:

$$R_A = R_{A0} + \Delta R_A \cos^2\theta' \qquad (2)$$

wherein $R_A$ is a contributing resistance by the AMR effect, $R_{A0}$ is a center resistance, $\Delta R_A$ is an amplitude of the contributing resistance change, and θ' is an angle between the current direction and the magnetization direction of the free magnetic layer.

As is apparent from equation 2, $R_A$ changes with θ'. This AMR effect causes variations in $R_g$ in equation 1, and thus the waveform distortion cannot be reduced.

Another factor in the waveform distortion is a magnetic field having a shape anisotropy. The magnetic shape anisotropy is a property that magnetization tends to be oriented longitudinally, for example, along the X-axis of the magnetoresistive element 2 or 3 in FIG. 7.

Figure 10:
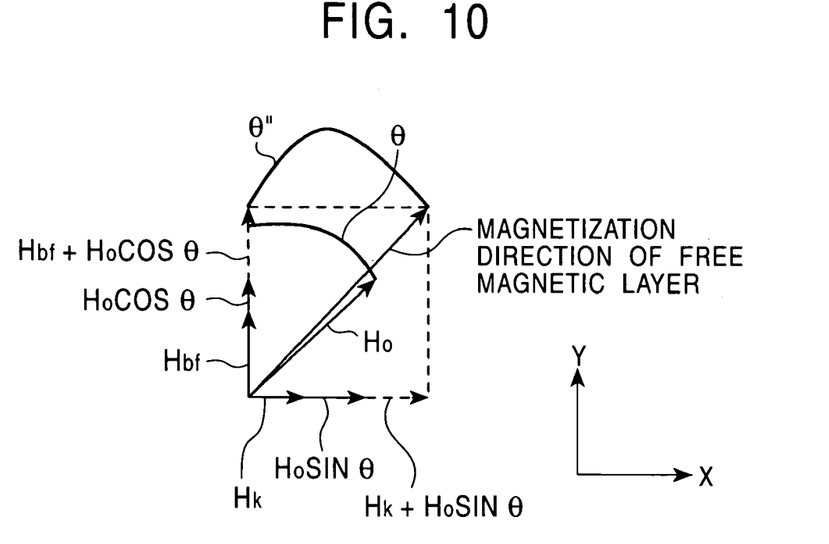
FIG. 10 is a schematic diagram illustrating a deviation in the magnetization direction of a free magnetic layer owing to a shape anisotropic magnetic field $H_k$.

FIG. 10 illustrates a deviation in the magnetization direction in the free magnetic layer, caused by the shape anisotropic magnetic field. Considering the shape anisotropic magnetic field $H_k$, the magnetization direction θ" of the free magnetic layer is expressed by the following equation:

$$\theta'' = \mathrm{TAN}^{-1}\frac{H_k + H_0\mathrm{SIN}\theta}{H_{bf} + H_0\mathrm{COS}\theta} \qquad (3)$$

wherein $H_0$ is an external magnetic field, $H_k$ is a shape anisotropic magnetic field, $H_{bf}$ is a bias magnetic field, θ is an external magnetic field direction, and θ" is a magnetization direction of a free magnetic layer.

Ideally, as described above, the magnetization direction of the free magnetic layer is identical to that of the external magnetic field $H_0$. However, as shown in FIG. 10, the shape anisotropic magnetic field $H_k$, as well as the bias magnetic field $H_{bf}$, causes the angle θ" of the free magnetic layer (the angle θ" is an inclination from the Y-axis) to deviate from the angle θ of the external magnetic field $H_0$.

Thus, to minimize the deviation, the shape anisotropic magnetic field $H_k$ is preferably as small as possible.

SUMMARY OF THE INVENTION

Accordingly, it is an object of the present invention to provide an angle sensor that exhibits a smaller waveform distortion of the output voltage than conventional angle sensors by the reduction of the AMR effect and the influence of the shape anisotropic magnetic field.

In one aspect, the present invention provides an angle sensor comprising:

a magnetoresistive element that includes a pinned magnetic layer having a fixed magnetization direction and a free magnetic layer having a magnetization direction that varies in proportion to an external magnetic field;

a substrate for supporting the magnetoresistive element; and a rotor that forms a magnetic field and faces the magnetoresistive element, wherein the magnetoresistive element includes an X-axis array in an X-axis direction being the width direction of the substrate and a Y-axis array in a Y-axis direction being the depth direction of the substrate, the X-axis array including a plurality of segments that extend in the X-axis direction and are spaced at a predetermined interval in the Y-axis direction, the predetermined interval being shorter than the length of the X-axis segments, ends of adjacent X-axis segments being connected so as to form a single meandering structure, the Y-axis array including a plurality of segments that extend in the Y-axis direction and are spaced at a predetermined interval in the X-axis direction, the predetermined interval being shorter than the length of the Y-axis segments, ends of adjacent Y-axis segments being connected so as to form a single meandering structure, and the magnetoresistive element has a single continuous structure in which the X-axis array and the Y-axis array are connected to each other at their ends.

In the aspect described above, the X-axis array and the Y-axis array have meandering structures, and the Y-axis array, when rotated 90°, has the same layout as the X-axis array.

Such a structure cancels the electrical resistance change caused by the AMR effect in the free magnetic layer, thus reducing the waveform distortion of the output voltage.

Preferably, the X-axis segments and the Y-axis segments have the same dimensions. This efficiently cancels the changes in the contributing resistance generated by the AMR effect in the free magnetic layer.

In another aspect, the present invention provides an angle sensor comprising:

a magnetoresistive element that includes a pinned magnetic layer having a fixed magnetization direction and a free magnetic layer having a magnetization direction that varies in proportion to an external magnetic field;

a substrate for supporting the magnetoresistive element; and a rotor that forms a magnetic field and faces the magnetoresistive element, wherein the magnetoresistive element includes a plurality of X-axis segments that extend in an X-axis direction being the width direction of the substrate, and a plurality of Y-axis segments that extend in a Y-axis direction being the depth direction of the substrate, the X-axis segments and the Y-axis segments having the same length and width, and being alternately connected to each other to form a single continuous structure.

Such a structure cancels the electrical resistance change caused by the AMR effect in the free magnetic layer, thus reducing the waveform distortion of the output voltage.

Preferably, each of the Y-axis segments is connected to each vertical surface of the X-axis segments, and each of the X-axis segments is connected to each horizontal surface of the Y-axis segments, so that the magnetoresistive element forms at least one row extending in the X-axis direction or the Y-axis direction, and each end of the rows in the same direction is alternately connected to form a single continuous structure, when said at least one row comprises a plurality of rows.

Such a structure allows the magnetoresistive element to be arranged efficiently on the narrow substrate. In general, the substrate has a predetermined size, depending on the situation, and the electrical resistance of the magnetoresistive element on the substrate (under the external magnetic field perpendicular to the magnetization direction of the pinned magnetic layer) is standardized to have a constant value. In this situation, when the magnetoresistive element including the X-axis segments and the Y-axis segments is provided on the substrate, the magnetoresistive element is preferably formed as a single continuous structure by connecting each end of the rows to reduce the changes in the contributing resistance due to the AMR effect.

In still another aspect, the present invention provides an angle sensor comprising:

a magnetoresistive element that includes a pinned magnetic layer having a fixed magnetization direction and a free magnetic layer having a magnetization direction that varies in proportion to an external magnetic field;

a substrate for supporting the magnetoresistive element; and a rotor that forms a magnetic field and faces the magnetoresistive element, wherein the magnetoresistive element includes a plurality of segments in an X-axis direction being the width direction of the substrate and a plurality of segments in a Y-axis direction being the depth direction of the substrate, the X-axis segments being spaced at a predetermined interval in the Y-axis direction, the Y-axis segments being spaced at a predetermined interval in the X-axis direction, the X-axis segments and the Y-axis segments being the same in number, length, and width.

Such a structure cancels the electrical resistance change caused by the AMR effect in the free magnetic layer, thus reducing the waveform distortion of the output voltage.

Preferably, the X-axis segments and the Y-axis segments have a width of 20 μm or more, and the ratio of length to width is less than 11.

Preferably, the X-axis segments and the Y-axis segments have a width of more than 20 μm, and the ratio of length to width is 11 or less.

Such restrictions on the dimensions of the magnetoresistive element reduce the deviation of the magnetization of the free magnetic layer caused by the shape anisotropic magnetic field $H_k$, bringing the magnetization close to the external magnetic field direction, and thereby the waveform distortion of the output voltage can be reduced.

DESCRIPTION OF THE PREFERRED EMBODIMENTS

Figure 1:
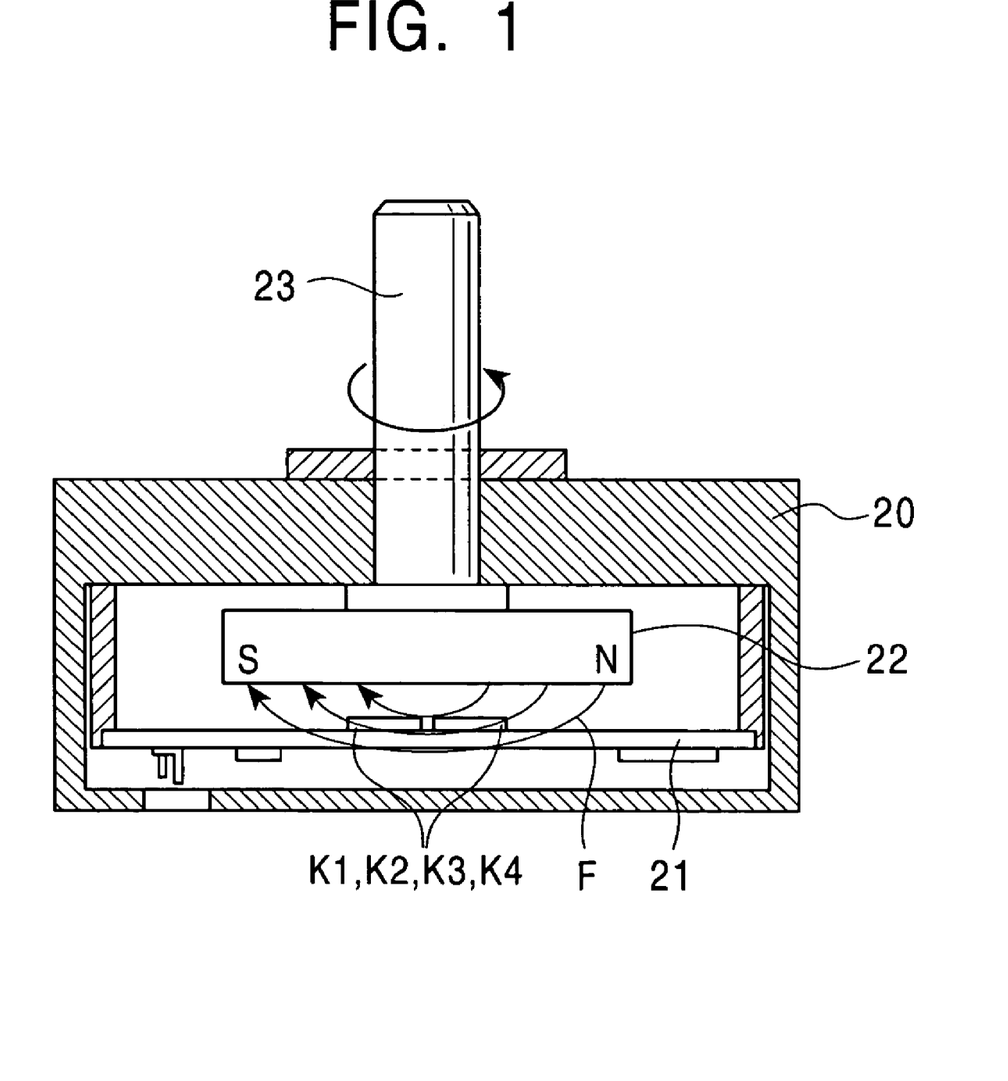
FIG. 1 is a cross-sectional view of a rotation angle sensor according to the present invention.

As shown in FIG. 1, a rotation angle sensor according to the present invention comprises a planar support (a fixed part) 21, which is made of a nonmagnetic material and is fixed on a case 20, and a rotor, which is disposed over the support 21 and has a discoidal magnet 22. The magnet 22, which faces the fixed part 21 and is made of, for example, ferrite, is polarized radially. The magnet 22 has a thickness of several millimeters and a radius of several centimeters.

A rotary shaft 23 made of a nonmagnetic material is fixed to the rotor, protrudes from the case 20, and is rotatably supported on the case 20.

Figure 4:
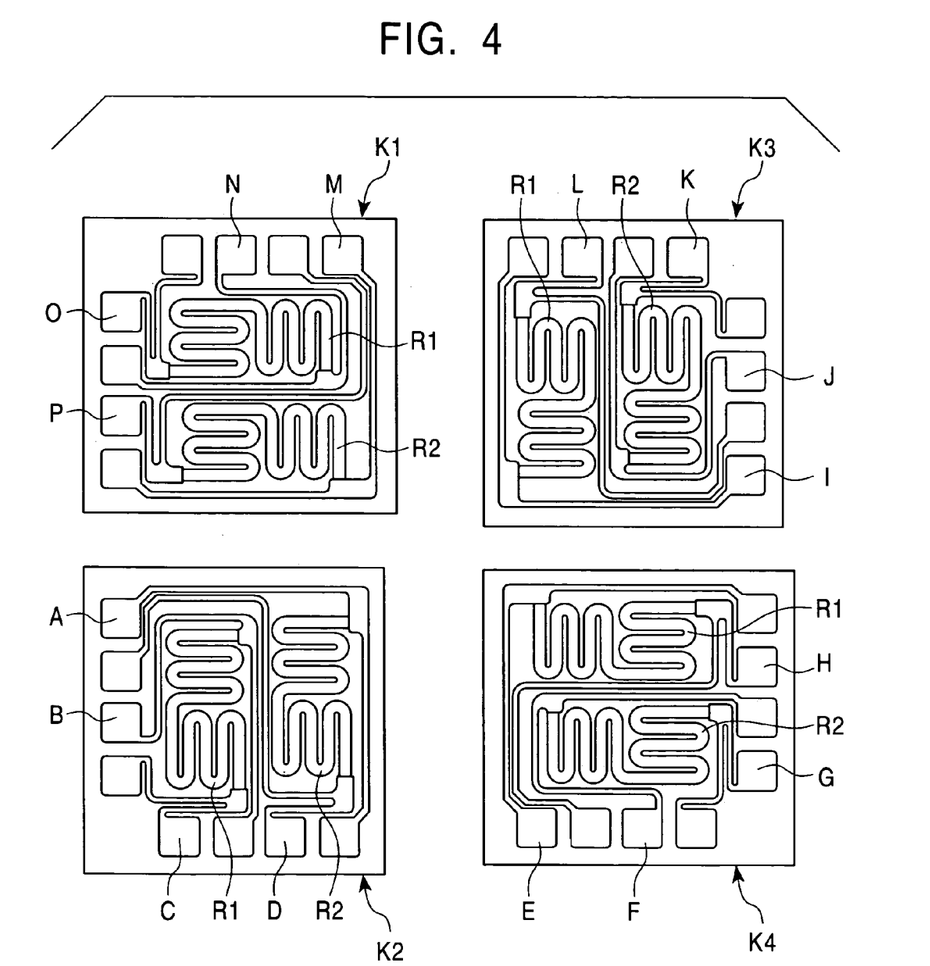
FIG. 4 shows some layouts of magnetoresistive elements mounted on substrates.

Substrates K1, K2, K3, and K4, each of which includes two magnetoresistive elements R1 and R2, as shown in FIG. 4, may be disposed on the support 21 and faces to the magnet 22.

Figure 6:
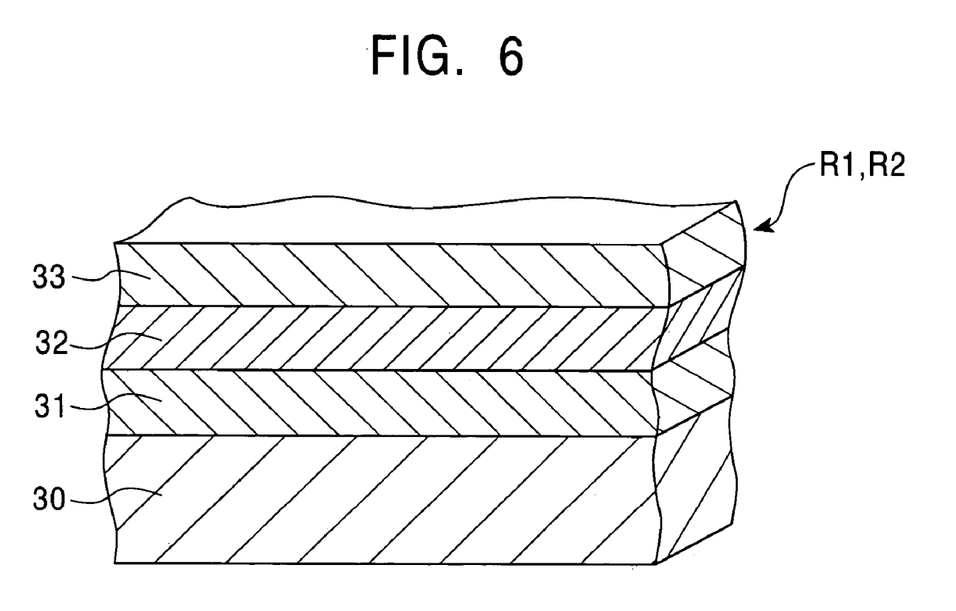
FIG. 6 is a fragmentary isometric sectional view of a magnetoresistive element.

The magnetoresistive elements R1 and R2 may be laminates, as shown in FIG. 6. The laminate may include an antiferromagnetic layer 30 made of PtMn alloy, a pinned magnetic layer 31 made of NiFe alloy, a nonmagnetic material layer 32 made of a nonmagnetic conductive material, such as Cu, and a free magnetic layer 33 made of a NiFe alloy in this order from the bottom.

The external magnetic field (a magnetic flux F from the magnet 22 in FIG. 1) induces a change in the magnetization of the free magnetic layer 33. On the other hand, the pinned magnetic layer 31 is magnetized in a predetermined direction by a coupling magnetic field generated between the pinned magnetic layer 31 and the antiferromagnetic layer 30.

While the magnetoresistive elements R1 and R2 shown in FIG. 6 are spin-valve thin film elements, they may be any other laminate structures having a first layer, such as the free magnetic layer 33, in which changes in magnetization are induced by the external magnetic field, and a second layer, such as the pinned magnetic layer 31, which has a fixed magnetization direction against the external magnetic field. Thus, changes in the angle between the first layer and the second layer cause variations in the electric resistance of the elements.

The magnetoresistive elements R1 and R2 on the substrates K1, K2, K3, and K4 shown in FIG. 4 have the same laminate structure.

Figure 2:
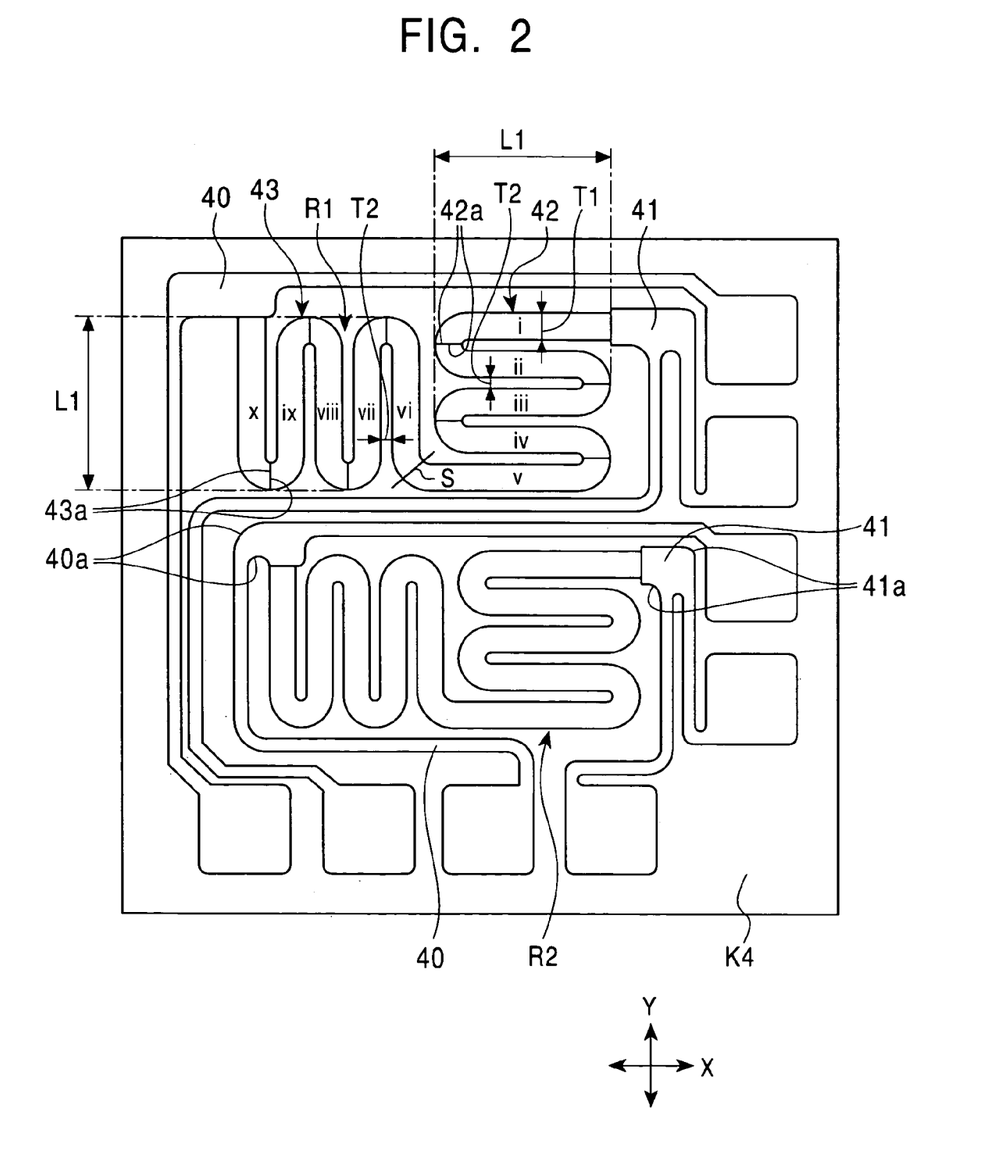
FIG. 2 is an enlarged plan view of a substrate that comprises a magnetoresistive element according to the present invention and is to be mounted on the sensor shown in FIG. 1.

As shown in FIG. 2, each end of the magnetoresistive elements R1 and R2 is connected to a lead 40 or 41 made of Au or Cu, from which electric current flows to the magnetoresistive elements R1 and R2.

As shown in FIG. 4, the opposite ends of the leads 40 and 41 are connected to terminals A-P, which are integrally or separately provided with the leads 40 and 41.

Figure 5A:
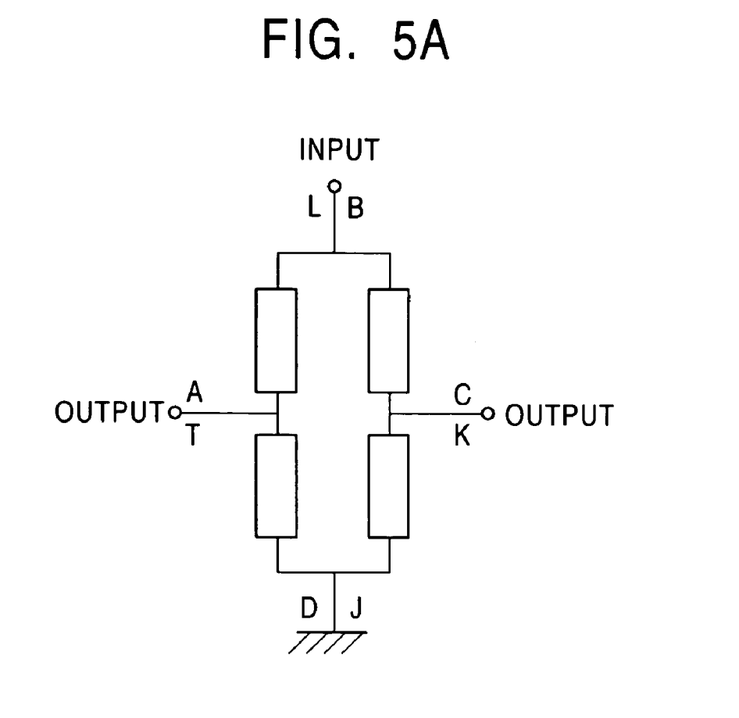
FIG. 5 shows circuit diagrams of a rotation angle sensor according to the present invention.
Figure 5B:
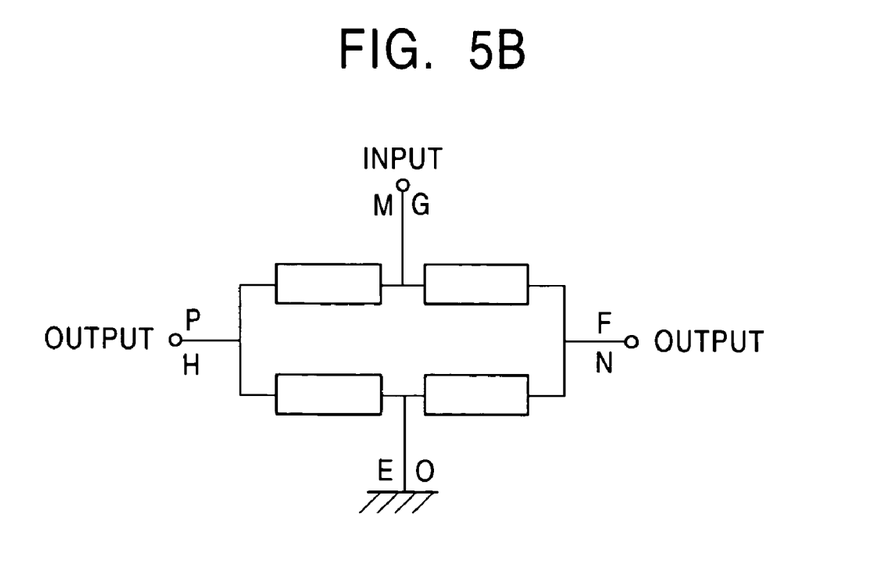

These terminals A-P are connected to one another as in FIG. 5, and constitute two Wheatstone bridges.

The structures of the magnetoresistive elements R1 and R2 on the substrates K1, K2, K3, and K4 are further described below.

The phrase "X-axis direction" used below means the width direction of the substrate K4, and "Y-axis direction" means the depth direction of the substrate K4, perpendicular to the X-axis direction.

The substrate shown in FIG. 2 is the substrate K4 shown in the lower right of FIG. 4. The two magnetoresistive elements R1 and R2 are disposed on the substrate K4 at a predetermined interval in the Y-axis direction.

The magnetoresistive element R1 includes an X-axi's array 42 and a Y-axis array 43, which are connected to each other at a boundary S. The X-axis array 42 shown on the right of the boundary S includes five X-axis segments (1)-(5) parallel to the X-axis, which are spaced at a predetermined interval T2 in the Y-axis direction. The predetermined interval T2 is sufficiently smaller than the length L1 of the X-axis segments (1)-(5) and is, for example, between 10 and 20 μm.

Ends 42a in the same direction of the adjacent X-axis segments ((1) and (2), (2) and (3), (3) and (4), (4) and (5)) are alternately connected to each other. Thus, the X-axis array 42 has a meandering structure.

The Y-axis array 43 includes five Y-axis segments (6)-(10) parallel to the Y-axis, which are spaced at a predetermined interval T2 in the X-axis direction. The predetermined interval T2 is sufficiently smaller than the length L1 of the Y-axis segments (6)-(10).

Ends 43a in the same direction of the adjacent Y-axis segments ((6) and (7), (7) and (8), (8) and (9), (9) and (10)) are alternately connected to each other. Thus, the Y-axis array 43 has a meandering structure.

The X-axis array 42 and the Y-axis array 43 are connected at the boundary S to form the single continuous structure of the magnetoresistive element R1.

The lines shown at the boundary S and the ends 42a and 43a are only provided for a better understanding, and final products do not have such lines. The X-axis array 42 and the Y-axis array 43 may be formed simultaneously by sputtering.

When rotated 90°, the Y-axis array 43 has the same layout as the X-axis array 42.

The five segments (1)-(5) of the X-axis array 42 and the five segments (6)-(10) of the Y axis array 43 have the same width T1 and the same length L1.

Thus, in the absence of the external magnetic field, the X-axis array 42 and the Y-axis array 43 will have almost the same electrical resistance under energized conditions.

The contributing resistance generated by the AMR effect in the magnetoresistive element R1 will be described below.

A contributing resistance $R_x$ generated by the AMR effect in the X-axis array 42 is expressed by the following equation according to the same theory illustrated in FIG. 9:

$$R_x = R_{B0} + \Delta R_B \cos^2\theta' \quad (4)$$

wherein, $R_x$ is a contributing resistance generated by the AMR effect in the X-axis array 42, $R_{B0}$ is a center resistance, $\Delta R_B$ is an amplitude of the electrical resistance change, and $\theta'$ is an angle between the current direction and the magnetization direction of the free magnetic layer 33.

Since the Y-axis segments (6)-(10) is perpendicular to the X-axis segments (1)-(5), the direction of the electric current passing through the Y-axis segments (6)-(10) is also perpendicular to that of the X-axis segments (1)-(5).

Thus, a contributing resistance $R_Y$ generated by the AMR effect in the Y-axis array 43 is expressed by the following equation, in which "$\Delta R_B \cos^2\theta'$" is replaced by the "$\Delta R_B \cos^2(\theta'+90)$", that is, "$\Delta R_B \sin^2\theta'$":

$$R_Y = R_{B0} + \Delta R_B \sin^2\theta' \quad (5)$$

wherein, $R_Y$ is a contributing resistance generated by the AMR effect in the Y-axis array 43, $R_{B0}$ is a center resistance, $\Delta R_B$ is an amplitude of the electrical resistance change, and θ' is an angle between the current direction and the magnetization direction of the free magnetic layer 33.

Equation 4 plus equation 5 gives the following equation:

$$R_x + R_Y = 2R_{B0} + \Delta R_B \quad (6)$$

because of $\cos^2\theta' + \sin^2\theta' = 1$.

As shown in equation 6, both $\cos^2\theta'$ and $\sin^2\theta'$ are precluded from the contributing resistance ($R_x + R_Y$) generated by the AMR effect in the magnetoresistive element R1, and thereby the contributing resistance can be limited to predetermined values. This cancels the electrical resistance change caused by the AMR effect, thus reducing the waveform distortion of the output voltage.

It should be noted again that equations 4 to 6 hold when the X-axis array 42 and the Y-axis array 43 in the magnetoresistive element R1 include five segments (1)-(5) and five segments (6)-(10), respectively, all the segments having the same width T1 and the same length L1, the X-axis array 42 and the Y-axis array 43 having the same $R_{B0}$ and the same $\Delta R_B$.

Thus, when the X-axis segments and the Y-axis segments are different in number, the X-axis 42 and the Y-axis array 43 will have different $R_{B0}$ and different $\Delta R_B$.

Even in such a situation, when $\Delta R_B \cos^2\theta'$ in equation 4 (denoted by $\Delta R_{B1} \cos^2\theta'$) and $\Delta R_B \sin^2\theta'$ in equation 5 (denoted by $\Delta R_{B2} \sin^2\theta'$) are added together, changes in the sum ($\Delta R_{B1} \cos^2\theta' + \Delta R_{B2} \sin^2\theta'$) caused by the variation of θ' can be smaller than those of conventional elements, and thereby changes in the contributing resistance generated by the AMR effect can be reduced.

Reduction in the shape anisotropic magnetic field $H_k$ is described below.

A reference shape anisotropic magnetic field $H_k$ (equals to 1) is set up with conventional magnetoresistive elements 2 and 3 that include segments having a length of 220 μm and a width of 20 μm, as shown in FIG. 7, on a substrate having sizes of 700 μm×700 μm in the X-axis direction and in the Y-axis direction.

Then, the width T1 and the length L1 of the magnetoresistive elements R1 and R2 in FIG. 2 are adjusted to have the same electrical resistance (in the absence of the external magnetic field) as the magnetoresistive elements 2 and 3. Changes in the shape anisotropic magnetic field $H_k$ of the magnetoresistive element R1 and R2 are then determined relative to the reference $H_k$ (Table 1).

TABLE 1

| | | Width (μm) | | | | | |
|---|---|---|---|---|---|---|---|
| | | 10 | 15 | 20 | 28 | 30 | 40 | 50 |
| Length (μm) | 550 | | | | | | | 0.4 (11) |
| | 440 | | | | | | 0.5 (11) | |
| | 330 | | | | 0.67 (11) | | | |
| | 305 | | | | 0.71 (10.9) | | | |
| | 220 | | | 1 (11) | | | | |
| | 165 | | 1.33 (11) | | | | | |
| | 114 | | | | 0.66 (4.1) | | | |
| | 110 | 2 (11) | | 0.95 (5.5) | | | | |
| | 60 | | | 0.85 (3) | | | | |
| | 45 | | 1.14 (3) | | | | | |
| | 30 | 1.71 (3) | | | | | | |

Values in parentheses are the ratio of length to width. This value is 11 at the reference $H_k$, in which the length is 220 μm and the width is 20 μm.

Table 1 shows that the shape anisotropic magnetic field $H_k$ of the magnetoresistive elements R1 and R2 is smaller than the reference $H_k$ when the width is 20 μm or more and the length/width ratio is below 11.

Alternatively, the shape anisotropic magnetic field $H_k$ of the magnetoresistive elements R1 and R2 is smaller than the reference $H_k$ when the width is more than 20 μm and the length/width ratio is 11 or less.

Thus, the segments (1)-(5) and (6)-(10) in the magnetoresistive elements R1 and R2 according to the present invention have the width T1 of 20 μm or more and the ratio of the length L1 to the width T1 of less than 11, or alternatively have the width T1 of more than 20 μm and the ratio of the length L1 to the width T1 of 11 or less, to reduce the shape anisotropic magnetic field $H_k$.

As shown in FIG. 2, the magnetoresistive element R2 has the same layout as the magnetoresistive element R1, and thus has the same effect as described above.

In addition, as shown in FIG. 4, the magnetoresistive elements R1 and R2 on the substrates K1, K2, and K3 have the same layout when the magnetoresistive elements R1 and R2 on the substrate K4 are turned 90° or 180°, and have the same shape and structure as the magnetoresistive elements R1 and R2 on the substrate K4.

While the magnetoresistive element R1 includes one X-axis array 42 and one Y-axis array 43 in FIG. 2, it may include a plurality of X-axis arrays 42 and a plurality of Y-axis arrays 43. Preferably, the number of the X-axis arrays 42 and the number of the Y-axis arrays 43 are the same. The plurality of X-axis arrays 42 and the plurality of Y-axis arrays 43 may be alternately connected to each other. Alternatively, a series of X-axis arrays 42 may be connected to a series of Y-axis arrays 43.

Preferably, the leads 40 and 41 at the ends of the magnetoresistive elements R1 and R2 have rounded or chamfered corners 40a and 41a rather than sharp edges.

Such rounded or chamfered corners prevent electric field from concentrating at the corners, suppressing electric discharge from the corners to other leads or the magnetoresistive elements R1 and R2. Thus, the electrostatic discharge (ESD) resistance can be improved.

Figure 3:
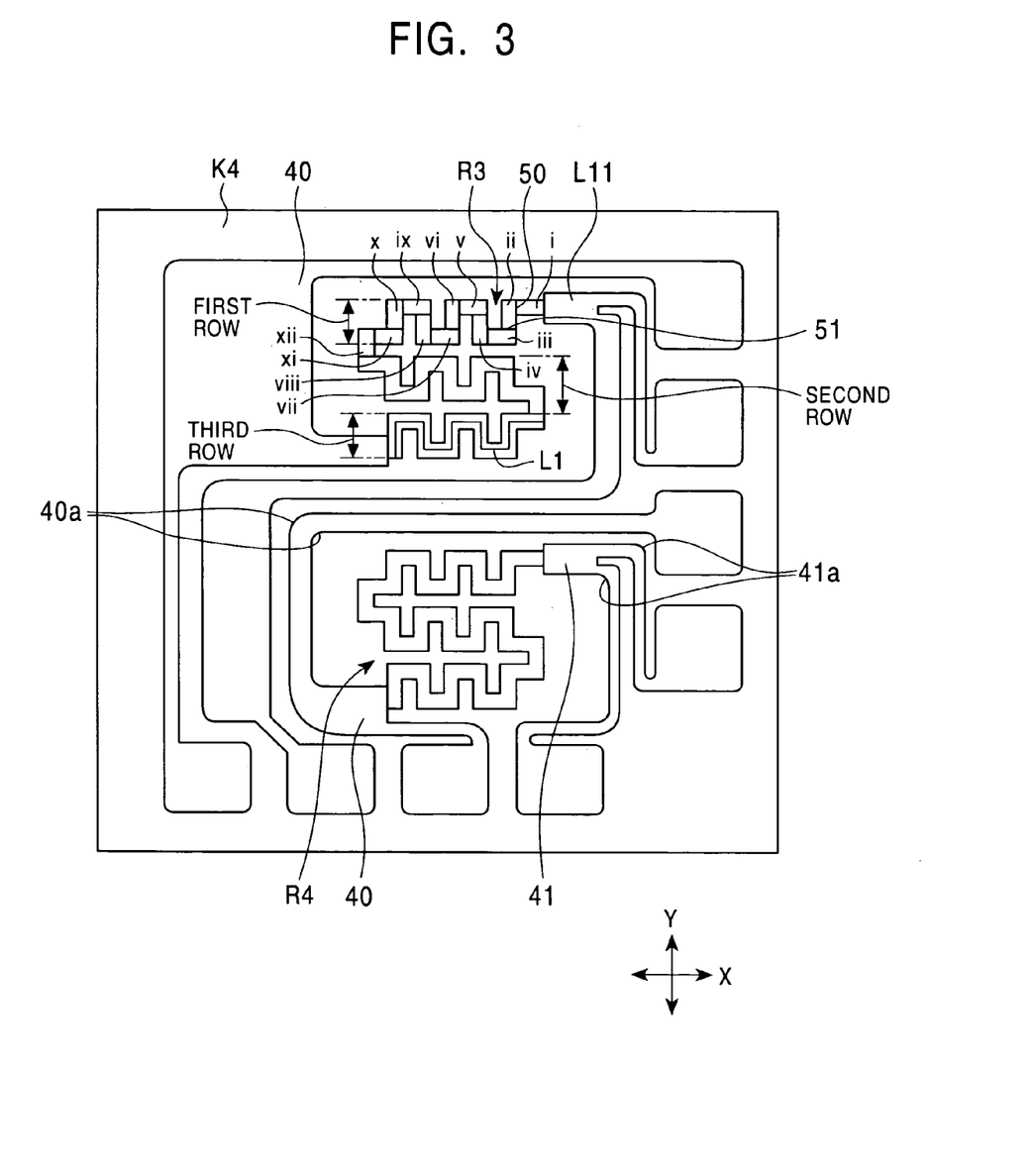
FIG. 3 is an enlarged plan view of a substrate that comprises a magnetoresistive element according to another embodiment of the present invention.

Another embodiment according to the present invention will be described below. FIG. 3 shows magnetoresistive elements R3 and R4 disposed on the substrate K4 shown in FIG. 4. The magnetoresistive elements R3 and R4 may have the same laminated structure as in FIG. 6. The magnetoresistive element R3 includes X-axis segments (1), (3), (5), (7), (9), and (11) (hereinafter referred to as merely "X-axis segments (1)")) parallel to the X-axis and Y-axis segments (2), (4), (6), (8), (10), and (12) (hereinafter referred to as merely "Y-axis segments (2)")) parallel to the Y-axis. Each of the Y-axis segments (2) is connected to each vertical surface 50 of the X-axis segments (1), and each of the X-axis segments (1) is connected to each horizontal surface 51 of the Y-axis segments (2). Thus, the X-axis segments (1) and the Y-axis segments (2) are alternately connected to each other, forming a meandering shape. The lines shown at the ends 50 and 51 are only provided for a better understanding, and the ends 50 and 51 cannot be seen in the final products. The X-axis segments (1) and the Y-axis segments (2) may be formed simultaneously by sputtering.

The magnetoresistive element R3 includes three rows. The X-axis segments (1) and the Y-axis segments (2) are alternately connected to each other to form a first row that extends to the left on the drawing. A second row extends from the left end of the first row to the right on the drawing. A third row extends from the right end of the second row to the left on the drawing. The second row and the third row also include the alternating combination of the X-axis segments and the Y-axis segments.

The X-axis segments (1) and the Y-axis segments (2) have the same width and the same length in FIG. 3.

Since the magnetic elements R3 and R4 have continuous structures of the three rows that include the same number of X-axis segments and Y-axis segments all having the same width and the same length, equations 4 to 6 hold in this case. Since changes in the contributing resistance generated by the AMR effect can be cancelled, the waveform distortion of the output voltage can be reduced, independent of the variation of $\theta'$.

The length of the row in FIG. 3, which is the length of a centerline shown in the third row, corresponds to the length L1 of the X-axis array 42 and the Y-axis array 43 in FIG. 2. The width of the X-axis segments (1) and the Y-axis segments (2) in FIG. 3 corresponds to the width T1 in FIG. 2.

Leads 40 and 41 have rounded or chamfered corners 40a and 41a.

The magnetoresistive elements R1 to R4 may have any shape, including those given in FIGS. 2 and 3.

To limit the contributing resistance generated by the AMR effect to a predetermined value independent of the variation of $\theta'$, the magnetoresistive element may have any structure that includes the same number of X-axis segments and Y-axis segments all having the same width and the same length, the X-axis segments being spaced at a predetermined interval in the Y-axis direction, the Y-axis segments being spaced at a predetermined interval in the X-axis direction.

An angle sensor according to the present invention detects a tilt angle or a rotation angle in any applications, including general industrial machinery, industrial robots, medical equipment, construction machinery, excavators, measuring equipment, transportation equipment, automobiles, and ships. For example, the angle sensor can be used as a rotation angle sensor of a steering wheel in an automobile.

What is claimed is:

1. An angle sensor comprising:
    a magnetoresistive element that includes a pinned magnetic layer having a fixed magnetization direction and a free magnetic layer having a magnetization direction that varies in proportion to an external magnetic field;
    a substrate for supporting the magnetoresistive element; and
    a rotor that forms a magnetic field and faces the magnetoresistive element,
    wherein the magnetoresistive element includes an X-axis array in an X-axis direction being the width direction of the substrate and a Y-axis array in a Y-axis direction being the depth direction of the substrate, the X-axis array including a plurality of segments that extend in the X-axis direction and are spaced at a predetermined interval in the Y-axis direction, the predetermined interval being shorter than the length of the X-axis segments, ends of adjacent X-axis segments being connected so as to form a single meandering structure, the Y-axis array including a plurality of segments that extend in the Y-axis direction and are spaced at a predetermined interval in the X-axis direction, the predetermined interval being shorter than the length of the Y-axis segments, ends of adjacent Y-axis segments being connected so as to form a single meandering structure, and the magnetoresistive element has a single continuous structure in which the X-axis array and the Y-axis array are connected to each other at their ends, and
    wherein the X-axis segments and the Y-axis segments have a width of 20 µm or more, and the ratio of length to width is less than 11.

2. The angle sensor according to claim 1, wherein the X-axis segments and the Y-axis segments have the same length and the same width.

* * * * *